April 23, 1935.                H. N. PARSONS                 1,999,055
                             BALL BEARING RETAINER
                              Filed May 5, 1934
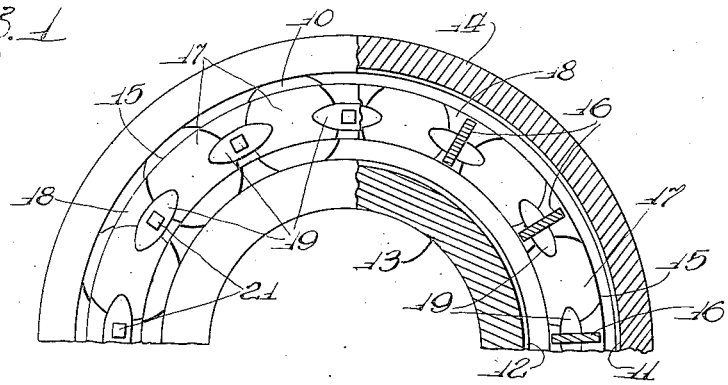
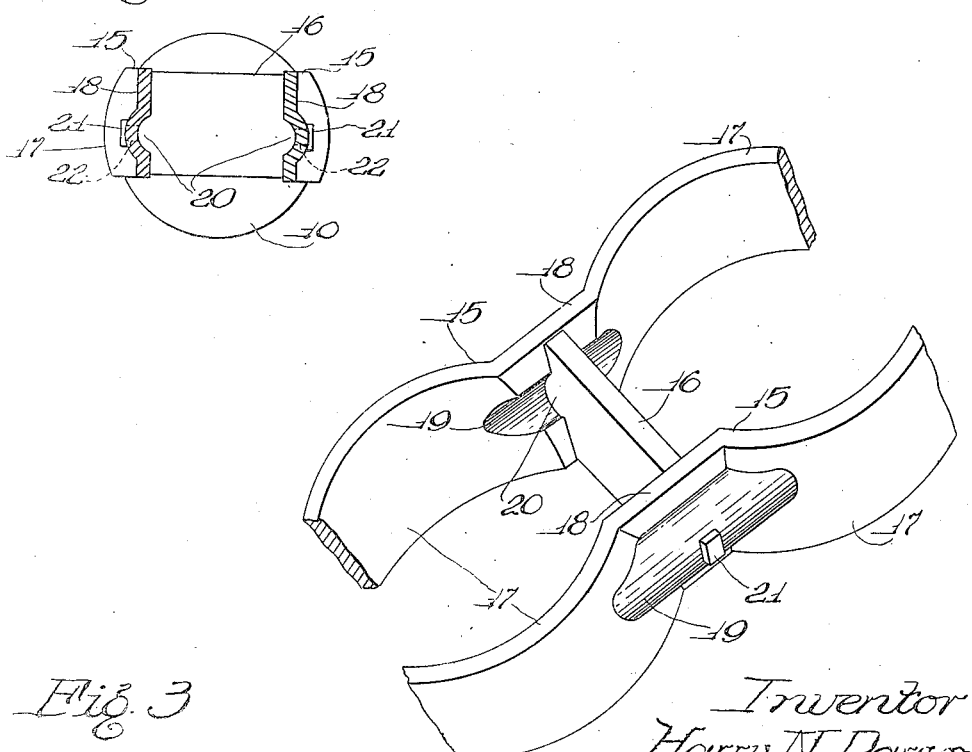
Inventor
Harry N. Parsons Patented Apr. 23, 1935

1,999,055

UNITED STATES PATENT OFFICE 1,999,055

BALL BEARING RETAINER

Harry N. Parsons, Chicago, Ill., assignor to International Harvester Company, a corporation of New Jersey Application May 5, 1934, Serial No. 724,105

3 Claims. (Cl. 308—201)

This invention relates to a retainer for ball bearings. More specifically it relates to a reinforced ball retainer construction to strengthen the retainers against forces to which they are subjected in service.

The principal object of the invention is to strengthen the side members of a ball retainer against bending forces which have proved destructive to certain types of retainers and cages.

This object and others which will be apparent are accomplished by a construction as shown in the drawing, in which:

Figure 1 is an end elevation of a conventional ball bearing assembly, broken away in section at one side, better to show the improved retainer embodying the invention;

Figure 2 is a radial cross section through the retainer shown in Figure 1 with a ball in place in the retainer; and, Figure 3 is a perspective view of a section of the improved retainer or cage.

As illustrated in the drawing, the retainer, or cage, as these retainers are sometimes called, of my invention may be incorporated in a conventional ball bearing. A plurality of balls 10 are arranged in grooves 11 and 12, respectively, of the inner raceway 13 and the outer raceway 14. The balls may be inserted in the raceways by any conventional method and the cage, or retainer, may be applied to the balls either after they are in place or before assembly, depending upon the method of assembly.

The retainer of ball cage consists of two annular sheet metal members 15 and spacer elements 16. Each of the members 15 is provided with a plurality of equally spaced, outwardly extending ball pockets 17 pressed to fit the surface of the ball. The ball pockets 17 are connected by flat bridging portions 18 of the members 15. It will be noted that, due to the larger diameter at the outer circumference of the side members 15 than the diameter of the inner edge, the connecting portions 18 are tapered in width from top to bottom.

In many ball bearing cages of the prior art, the ball pockets have been joined by entirely flat portions of the side members. In use, stresses are developed at the junction of the ball pockets with the bridging portions. These stresses tend to flex the side members and to eventually cause fatigue of the metal, with subsequent breaking, particularly at the connecting line between the ball pockets and the bridging portions. It is to overcome this weakness that applicant's improved retainer has been developed.

As illustrated, each two adjacent ball pockets 17 have been connected by an outwardly extending, reinforcing channel 19 extending across the flat connecting portion and into the spherical portion of the ball pockets. By this construction a substantial bracing effect is obtained at the normally weak points in the side members. The stiffness and rigidity of the side members are greatly increased and the flexing is eliminated or reduced to a point where it does not cause breakage.

For connecting the side members 15, spacing elements 16 are utilized. These elements abut the flat connecting portions 18 and are formed with bosses or extensions 20 which fit into the channels 19. Extensions 21 from the spacing elements, which may be termed tangs, project through openings 22 in the channels 19 and are riveted for holding the side members 15 rigidly in position, thus forming a unitary cage for the balls.

As illustrated and described, a certain type of reinforcing channel has been shown and plain spacing elements have been utilized. It is to be understood that the channels may assume different shapes and proportions, the principal idea being to connect the several ball pockets by reinforcing means other than a flat connection, whereby the rigidity of the side members is improved. It is also obvious that any type of conventional spacing elements may be used for connecting the side members. Applicant claims as his invention all modifications falling within the scope of the appended claims.

What is claimed is:

1. A ball bearing retainer comprising two spaced annular side members, said members being formed with spaced ball pockets connected by flat portions and stiffening grooves extending across the flat portions, and spacer elements extending between the side members and secured to the flat portions, said members being formed at their ends to fit the stiffening grooves.

2. A ball bearing retainer comprising two spaced annular side members, said members being formed with spaced ball pockets and stiffening grooves extending across the space between the two pockets, and spacer elements extending between the side members and secured to the portions between the ball pockets, said members being formed at their ends to fit the stiffening grooves.

3. A ball bearing retainer comprising two spaced annular side members, said members being formed with spaced ball pockets and stiffening grooves extending in a circumferential direction across the space between the two pockets and into the pockets, and spacer elements extending between the side members and secured to the portions between the ball pockets, said members being formed at their ends to fit the stiffening grooves.

HARRY N. PARSONS.